(12) United States Patent
Faccin (10) Patent No.: US 7,965,527 B2
(45) Date of Patent: Jun. 21, 2011

(54) TEMPERATURE PROTECTION DEVICE FOR ELECTRONIC CONVERTERS AND RELATED METHOD

(75) Inventor: Marco Faccin, Caerano san Marco (IT)

(73) Assignee: OSRAM Gesellschaft mit beschraenkter Haftung, Munich (DE)

( * ) Notice: Subject to any disclaimer, the term of this patent is extended or adjusted under 35 U.S.C. 154(b) by 419 days.

(21) Appl. No.: 12/087,786

(22) PCT Filed: Jan. 22, 2007

(86) PCT No.: PCT/EP2007/050580
§ 371 (c)(1),
(2), (4) Date: Jul. 15, 2008

(87) PCT Pub. No.: WO2007/085580
PCT Pub. Date: Aug. 2, 2007

(65) Prior Publication Data
US 2009/0034307 A1   Feb. 5, 2009

(30) Foreign Application Priority Data
Jan. 24, 2006 (EP) .................................... 06425032

(51) Int. Cl.
*H02H 7/122* (2006.01)
(52) U.S. Cl. .................... 363/56.02; 323/907; 361/93.8
(58) Field of Classification Search .................. 363/50, 363/55, 56.01, 56.02, 56.03, 56.05, 56.06, 363/56.09; 361/18, 37, 93.8, 103, 115; 323/907
See application file for complete search history.

(56) References Cited

U.S. PATENT DOCUMENTS

| | | | | |
|---|---|---|---|---|
| 5,008,771 A * | 4/1991 | Palara | ........................... | 361/103 |
| 6,222,322 B1 * | 4/2001 | Stack | ............................. | 315/119 |
| 6,856,098 B2 * | 2/2005 | Piaskowski | ................... | 315/224 |
| 7,149,098 B1 * | 12/2006 | Chen | .......................... | 363/56.09 |
| 2004/0070910 A1 * | 4/2004 | Gergintschew | .............. | 361/103 |
| 2007/0080905 A1 * | 4/2007 | Takahara | ........................ | 345/76 |

OTHER PUBLICATIONS

Grabel, Microelectronics (2$^{nd}$ ed.), McGraw-Hill Int'l Eds., XP002388164, pp. 679-682 (1987).
Prieto et al., "Closing a Second Feedback Loop in DC/DC Converters Based on Piezoelectric Transformers," 2004 Power Elecs. Spec. Conf., IEEE, pp. 4682-4688 (Jun. 20, 2004).

\* cited by examiner

*Primary Examiner* — Harry Behm
*Assistant Examiner* — Matthew Grubb (57) ABSTRACT

A device for protecting an electronic converter, e.g. for halogen lamps, includes a comparator having an output as well as non-inverting and inverting inputs for receiving a first input signal indicative of the load applied to the converter and a second input signal indicative of the temperature of the converter. The comparator is in a non-inverting Schmitt-trigger configuration having an input-output characteristic with hysteresis. Consequently, the output is switched from a first value to a second value to switch off the electronic converter as the first input signal exceeds a first threshold value. The output is switched back from the second value to the first value to restart the electronic converter when the first input signal falls below a second threshold value. The second threshold value is lower than the first threshold value, and both threshold values are a function of the signal indicative of the temperature of the converter.

14 Claims, 5 Drawing Sheets

TEMPERATURE PROTECTION DEVICE FOR ELECTRONIC CONVERTERS AND RELATED METHOD

FIELD OF THE INVENTION

The present invention relates to protection devices for electronic converters and was developed with specific attention paid to its possible use in connection with AC/DC converters for halogen lamps.

DESCRIPTION OF THE RELATED ART

In order to permit electronic converters to properly comply with norms and standards, safety must be preserved even in the presence of abnormal working conditions, i.e., a current load higher than the nominal value applied at the output or an ambient temperature higher than the maximum temperature recommended by the designer. Additionally, automatic restarting of the converter once the abnormal working condition is terminated is a desirable feature.

A common topological arrangement adopted for electronic converters is an auto-oscillating half-bridge directly supplied with the output voltage coming from a bridge rectifier. For example, in the case of a 50 Hz mains voltage, the output voltage from the bridge rectifier will be a 100 Hz pulsed voltage. Auto-oscillation stops at each zero point of the supply voltage, and a circuit element must periodically re-ignite the half-bridge. This is typically obtained by means of a ignition capacitor; the capacitor is charged until its voltage reaches the gate threshold of a diac and the discharge thus produced causes auto-oscillation to (re)start in the half bridge.

Most of the over-load/over-temperature protection arrangements proposed so far for such converters include a low impedance path in parallel to the ignition capacitor, so that ignition of the half-bridge becomes impossible. This sort of solution can operate properly only when the converter is supplied with AC voltage. In the presence of a DC supply voltage the ignition of the half-bridge is necessary only when the converter is supplied for the first time; after that, the voltage through the ignition capacitor may remain at any level below the threshold of the diac. In that way, the presence of a low impedance path through in parallel to the ignition capacitor has no impact on operation of the converter. This means that, if the converter is supplied with DC voltage, the protection arrangement does not operate correctly and is not able to guarantee safety as requested.

A number of over-load/over-temperature protection arrangements of the prior art thus include two different and independent stages. The former stage includes a heat sensitive component (e.g. a thermal resistor, such as a PTC or a NTC) and acts on the ignition capacitor (only) as a function of the temperature detected by the heat sensitive component. The latter stage is dedicated to protection against current overloads and detects, at specific point(s) in the circuit certain electrical signals, signals that may be indicative of an overload condition but are generally independent of the temperature; also the latter stage finally acts onto the ignition capacitor.

OBJECT AND SUMMARY OF THE INVENTION

The object of the invention is to provide an improved over-load/over-temperature protection arrangement that is exempt from the disadvantages and drawbacks portrayed in the foregoing.

According to the present invention, that object is achieved by means of a protection device having the features set forth in the claims that follow. The invention also concerns a related converter and a related method. The claims are an integral part of the disclosure of the invention provided herein.

A preferred embodiment of the arrangement described herein is thus an AC/AC or DC/AC converter which provides a high frequency, insulated low voltage signal adapted to supply 12 V halogen lamps.

The arrangement described herein prevents the active components in the Electronic Control Gear (ECG) undesired from reaching high temperatures when a power overload is applied at its output (e.g. due to a wrong installation), or ambient temperature reaches a level higher than a maximum recommended level for operation.

The arrangement described herein operates also when the converter is supplied with a DC voltage and further provides an integrated solution for protection both against over-load and over-temperature.

The arrangement described herein combines the information related to the temperature and to the load present at the output of the converter and generates a signal adapted to actuate components e.g. to stop the oscillation of the half-bridge; this both in the presence of AC supply and in the presence of DC supply.

BRIEF DESCRIPTION OF THE ANNEXED REPRESENTATIONS

The invention will now be described, by way of example only, with reference to the enclosed figures of drawing, wherein.

DETAILED DESCRIPTION OF PREFERRED EMBODIMENTS OF THE INVENTION

Figure 1:
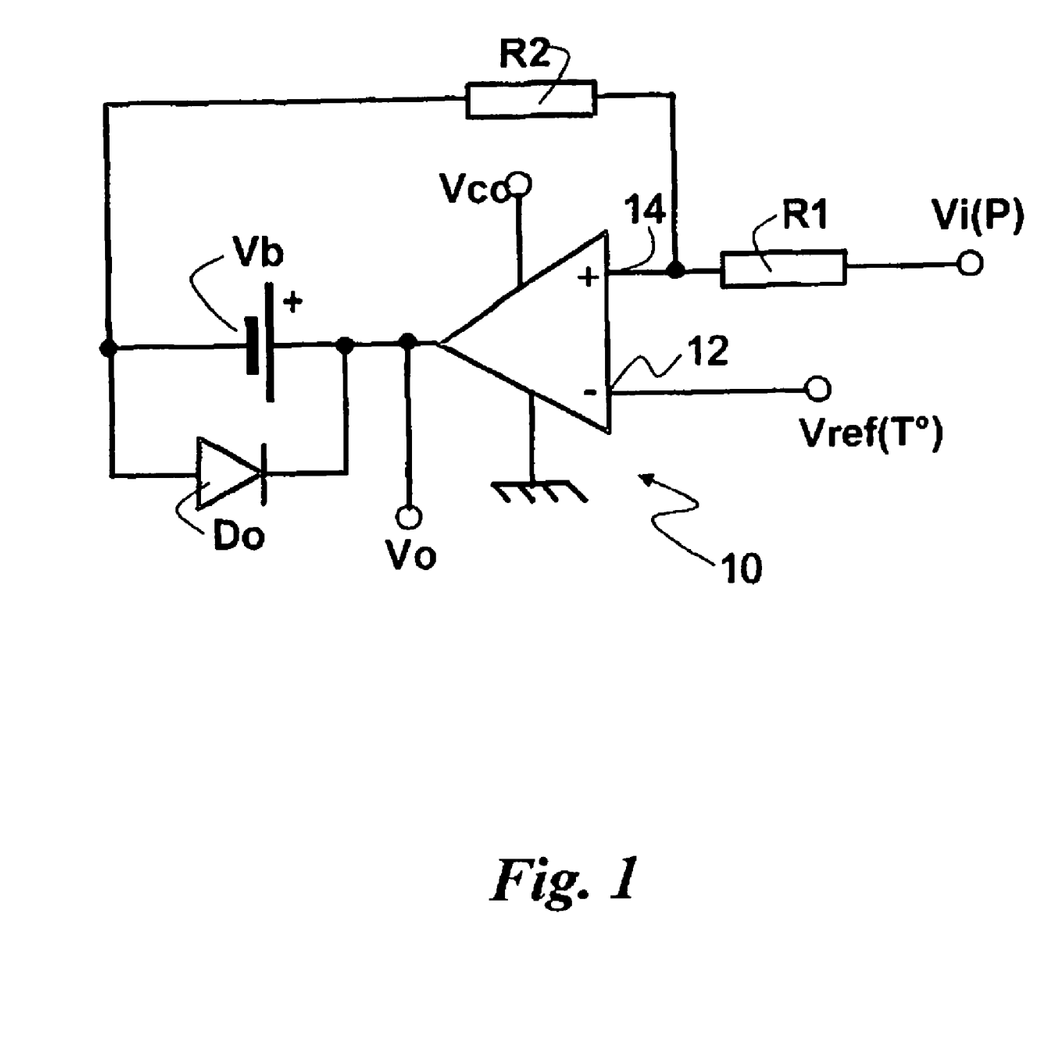
FIG. 1 is a block diagram exemplary of the basic principle underlying the arrangement described herein.

The block diagram of FIG. 1 shows the "core" of the arrangement described herein. This essentially includes a comparator 10 used in a non-inverting Schmitt-Trigger configuration.

In this exemplary case, the inverting input 12 receives a signal Vref(T°) in the form of a continuous, temperature dependent voltage. Preferably Vref(T°) is selected as a signal (produced as better described in the following) that decreases as the temperature increases.

Similarly, in the exemplary case illustrated, the non-inverting input 14 receives a signal Vi(P) in the form of a continuous voltage (produced as better detailed in the following) that is representative of the load, and thus the power, at the output of an associated converter circuit—not shown in FIG. 1.

Specifically, the load-dependent signal Vi(P) is applied to the non-inverting input 14 of the comparator 10 via a resistor R1. Connected to the non-inverting input 14 of the comparator 10 is another resistor R2 that is series-connected to a circuit comprised of a constant voltage source Vb connected in parallel to a diode Do. The positive terminal of the source Vb and the cathode of the diode Do are connected to the output of the comparator 10 where an output voltage Vo is present. Preferably, the comparator 10 is powered by means of a single supply voltage Vcc, which is easier to obtain than a double supply+/−Vcc).

Figure 2:
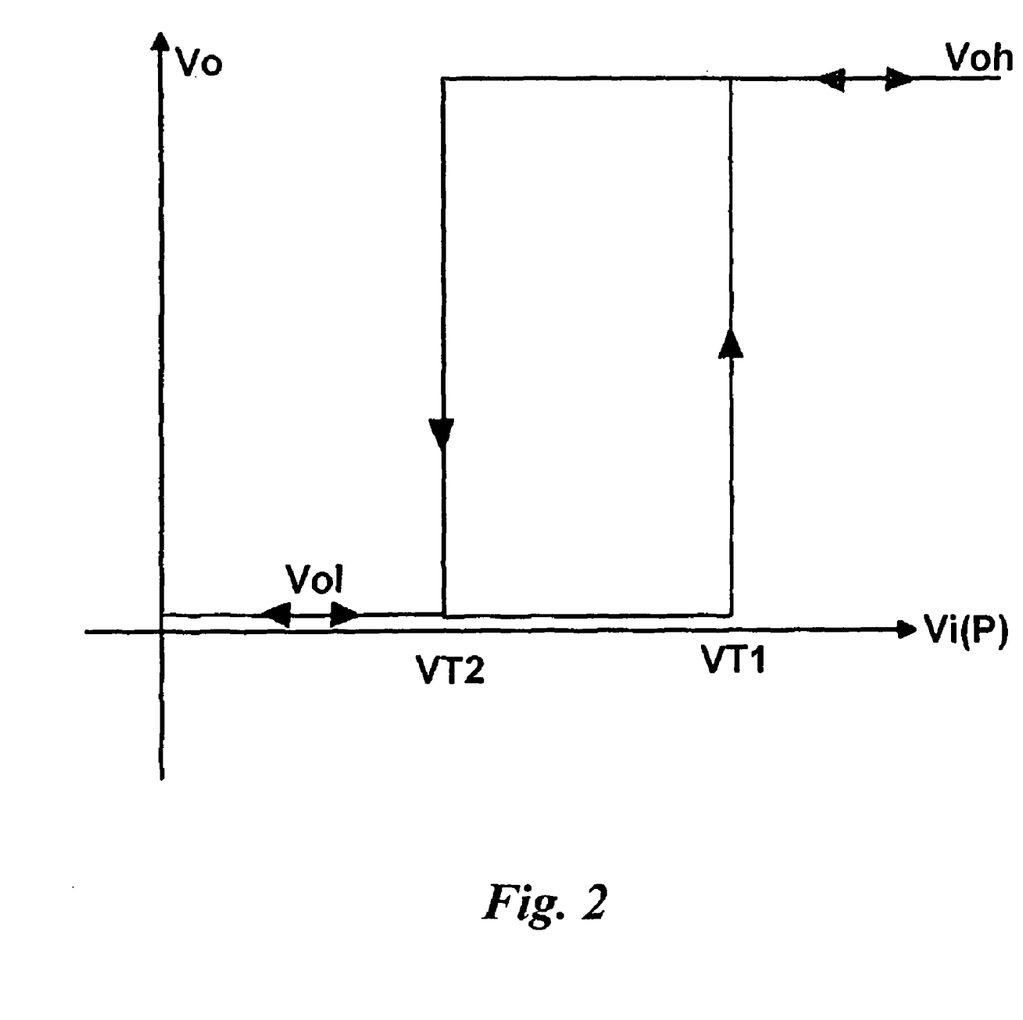
FIG. 2 is a diagram illustrative of operation of the arrangement shown in FIG. 1.

As shown in the diagram of FIG. 2, the output voltage Vo from the comparator 10 (ordinate scale) is a two-level signal varying between a low level Vol, typical equal to 0.5 V, and a high level Voh, typically equal to Vcc-1.5V. Specifically, the diagram of FIG. 2 shows the input-output characteristic of the circuit of FIG. 1 as a function of the load-dependent signal Vi(P) (abscissa scale). For instance, one may assume that Vi(P) is e.g. proportional (not necessarily directly) to the power at the output of the associated converter.

The diagram of FIG. 2 shows a typical hysteresis cycle: above a certain upper limit VT1 for Vi(P) (i.e. too high an output power), the output voltage V0 goes to the high level Voh. The output voltage V0 will then return to the low level Vol only when the signal Vi(P) goes below another, lower value VT2 for Vi(P), with VT2<VT1.

The output signal Vo can be used to stop the half-bridge of the associated converter. Specifically, when reaching the high level Voh (because the output power from the associated converter becomes too high), Vo stops—by any known means, that do not require a detailed description herein—operation of the converter and remains in this state (i.e. Vo=Voh) until the absence of output power causes Vi(P) to decrease and fall below the value VT2. At that point, the converter is re-started by Vo at the low level Vol.

The presence of an overload can be displayed to the user benefit e.g. by the flashing of a lamp prompted by Vo reaching the high level Voh, which is indicative of the presence of abnormal condition.

Operation of the arrangement illustrated in FIG. 1 is also dictated by the temperature-dependent signal Vref(T°).

In fact, circuit analysis of the arrangement illustrated in FIG. 1 shows that the value for VT1 can be expressed as:

$$VT1 = Vref(T°) * \left(1 + \frac{R1}{R2}\right) - (V_{OL} + V\gamma) * \frac{R1}{R2}$$

where Vγ is the forward voltage, namely the voltage across the diode Do when the Vo=Vol so that the diode is conducting. This voltage has the opposite direction of the current at the output of the comparator 10.

Similarly, circuit analysis of the arrangement illustrated in FIG. 1 shows that the value for VT2 can be expressed as:

$$VT2 = Vref(T°) * \left(1 + \frac{R1}{R2}\right) - (V_{OH} + Vb) * \frac{R1}{R2}.$$

The contribution of Vb is now evident, in that Vb can be adjusted to make the difference ($V_{OH}$−Vb) very small, thus preventing VT2 from possibly becoming negative or too close to zero. Stated otherwise, the generator Vb ensures that, with the typical voltages present in the circuit, the threshold VT2 will never become negative; in that case, re-ignition of the converter would become impossible.

The two formulas reported in the foregoing make it clear that the "position" of the hysteresis cycle depends directly on the value of the temperature-dependent signal, namely Vref (T°), while the "width" of the hysteresis cycle, that is the difference $$VTH = VT1 - VT2 = (V_{OH} - V_{OL} - Vb - V\gamma) * \frac{R1}{R2},$$

can be adjusted by acting on Vb and Vγ.

The foregoing highlights a number of basic factors.

In the first place, the arrangement just described is adapted to implement an over-load (i.e. over-current) protection function due to the presence and the behaviour of the signal Vi(P): if the load becomes too high, the ensuing increase in Vi(P) causes Vo to go to Voh, thus discontinuing operation of the converter.

In the second place, the arrangement just described is adapted to implement a thermal (i.e. over-temperature) protection function due to the presence and the behaviour of the signal Vref(T°): if the temperature becomes too high, the ensuing decrease of Vref(T°) causes Vo to go to Voh, thus again discontinuing operation of the converter (since VT1<Vi (P)), so that the converter can be switched-off for over-temperature. After this, Vi(P) goes low with a certain time constant and the converter can be re-started. If the temperature is still too high, the converter will work only for a short time before being shut down again.

In either case considered above, the occurrence of an abnormal condition can be communicated to the user, e.g. by a blinking/flashing light.

As a further point, it will be appreciated that an increase in the temperature causes a decrease of both VT1 and VT2 together, so that the higher the temperature, the smaller the value of Vi(P) that causes Vo to go to the high level, Voh. Thus the upper operational limit set for over-load protection decreases as the temperature increases; this interdependence ensures that the temperature of the components within the device will never reach values that are too high.

Figure 3:
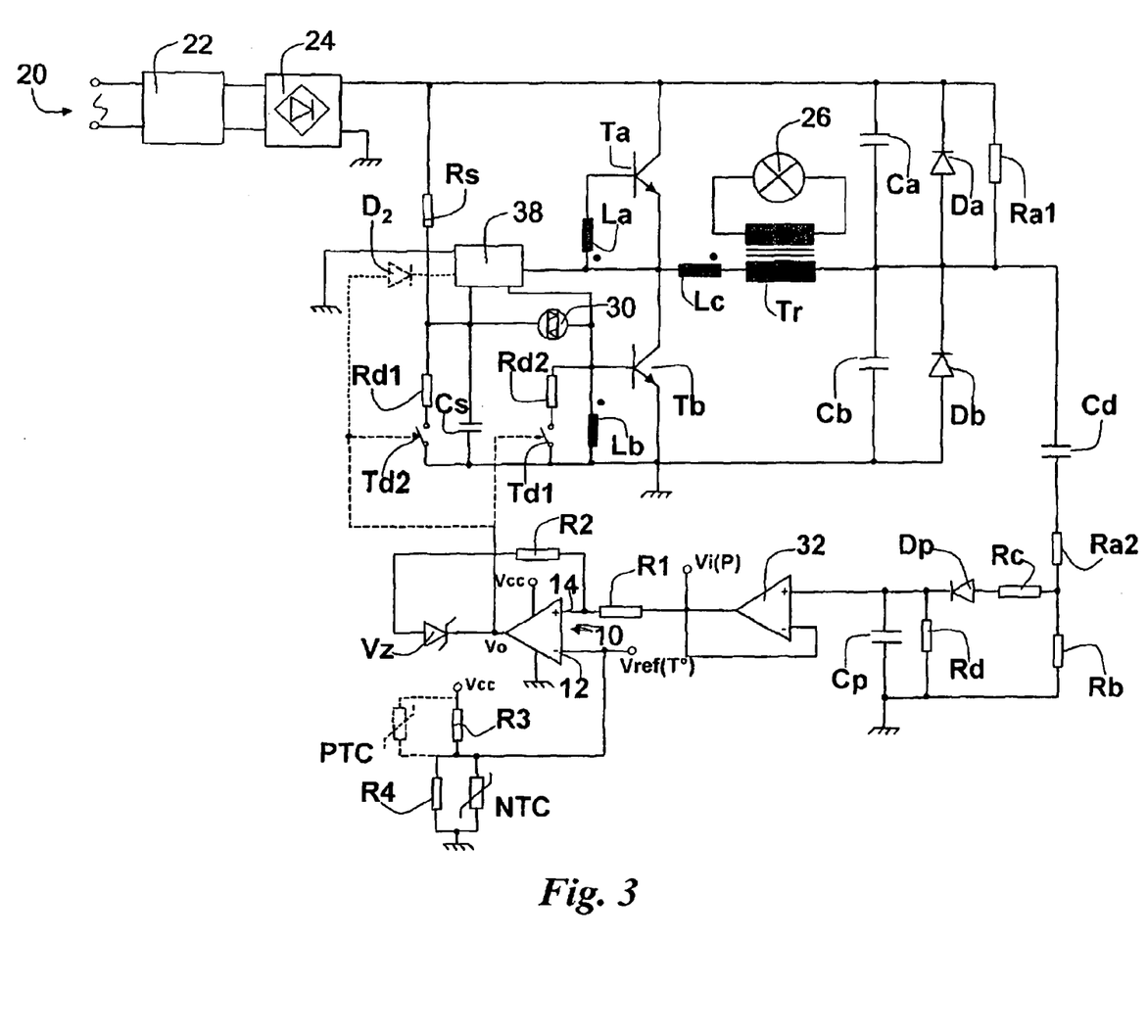
FIG. 3 is a general block diagram of a converter incorporating the arrangement described herein.

FIG. 3 shows the possible application of the protection device described in the foregoing within the framework of a converter that supplies electrical power derived from a power source 20 (e.g. a mains voltage) via a line filter 22 and a half-bridge rectifier 24 to a light source 26 connected to the secondary winding of a transformer Tr. The source 26 can be comprised e.g. of one or more halogen lamps, fluorescence lamps, high flux LEDs or the like.

In that respect, those of skill in the art will appreciate that the arrangement described herein is adapted for use in connection with any switching converter based on a half-bridge topology. Those of skill in the art will also appreciate that, apart from the details related to the protection device discussed in the foregoing and some specific points mentioned in the following, the block diagram of FIG. 3 generally corresponds to converter layouts that are per se known from the prior art, thus making it unnecessary to provide a more detailed description herein.

In brief, the primary winding of the transformer Tr, having a polarization inductance Lc, is driven via a half-bridge arrangement including:

two electronic switches (e.g. MOSFETs or BJTs) Ta, Tb each having an associated gate inductance La, Lb, and
two capacitors Ca, Cb each having an associated protection diode Da, Db.

The two electronic switches Ta, Tb are alternatively switched on and off by means of a control circuit 38 having associated a Diac 30. Essentially, the Diac 30 is interposed between the gates of the electronic switches Ta, Tb and the intermediate point of a voltage divider comprised of:

an "upper" resistor Rs connected to the output of the rectifier 24, and a "lower" resistor Rd1 connectable to ground via a switch Td2, a capacitor Cs being connected in parallel to the resitor Rd1.

Another resistor Rd2 is connected to the gate of the electronic switch Tb; the resistor Rd2 is adapted to be connected to ground via a switch Td1. The resistor Rds essentially represents the natural resistance that each active component, like a MOSFET or a BJT, shows at its output.

Both switches Td1 and Td2 are driven by the output voltage V0 of the comparator 10, a protection diode D2 (shown in dashed lines) being preferably provided having its anode connected the output voltage V0 of the comparator 10 and its cathode connected to the control circuit 38.

Preferably switch Td1 is driven by the voltage V0 via a switch off delay circuit, that is not shown in FIG. 3. The switch off delay circuit may be realised by a capacitor connected to the driving terminal of the switch Td1. Furthermore the switch Td1 is driven by Vo via a resistor that is parallel connected to a diode. The diode allows a quick switch on of Td1 and the resistor and the capacitor keep Td1 switched on for a certain amount of time. The switch off delay circuit is optional and prevents the half bridge from spurious oscillations when a shut down occurs.

The components 10, R1, R2 and Dz form the circuit previously described in connection with FIGS. 1 and 2 whose output Vo is used to de-activate the converter when Vo reaches the value Voh as a result of an anomalous current and/or temperature load being detected.

In FIG. 3 the parallel connection of the voltage source Vb and the diode Do of FIG. 1 (presented as separate components in order to highlight the significance of the parameter Vb and Vγ related thereto) has been simply represented in the form a Zener diode VZ having its cathode connected to the output of the comparator 10. Such a Zener diode VZ can in fact be regarded as equivalent to the parallel connection of a voltage source Vb (with Vb being the avalanche voltage of the zener diode) and a diode Do having a forward voltage equal to Vγ.

The circuit formed by the components Rs, Cs and the Diac 30 allows the ignition of the half-bridge at each zero point of the supply voltage.

At the intermediate point between Ca and Cb there is a DC voltage having superimposed thereon a high (oscillation) frequency ripple, whose amplitude depends on the load applied at the converter output.

This dependence is used to generate the load-dependent signal Vi(P) for feeding the non-inverting input of the comparator 10. The related sensing arrangement includes, in addition to a first resistor Ra1 connected in parallel to the diode Da, a capacitor Cd connected to the secondary winding of the transformer Tr plus a network essentially comprised of two resistors Ra2 and Rb comprising a voltage divider interposed between the capacitor Cd and ground.

The function of the resistor Ra1 will be explained in detail in the final part of this description.

The values of Ra2 and Rb are selected in order to cause the characteristic frequency $$fp = \frac{1}{2*\pi*Cd*(Ra2+Rb)}$$

to be much lower than the lowest oscillation frequency imposed on the half-bridge arrangement, but generally higher than the typical frequency of the rectified main voltage (e.g. 100-120 Hz), so that the voltage which appears through Ra2 and Rb is only indicative of the ripple amplitude present at the intermediate point between the capacitors Ca and Cb without any influence of the low frequency main voltage.

The voltage divider comprised of the resistors Ra2 and Rb scales this ripple signal and feeds it, via a resistor Rc, to a quasi peak-detector network including a diode Dp loading a RC network. The RC network includes the parallel connection of a capacitor Cp and a resistor Rd that jointly define the charge and discharge time constants of the detector.

As a result, the continuous voltage across the capacitor Cp is representative of (in fact, proportional to) the load applied at the converter output (i.e. the transformer Tr).

An op-amp 32 acting as a voltage-follower (i.e an impedance separator) is used to transfer that signal as the signal Vi(P) applied to the comparator 10.

Another voltage divider interposed between the supply voltage Vcc and ground includes two resistors R3 and R4 having a NTC (Negative Temperature Coefficient) resistor in parallel to R4—as shown in full line—and/or a PTC (Positive Temperature Coefficient) resistor in parallel to R3—as shown in dashed line—to produce the temperature-dependent signal Vref(T°), which decrease with an increase in the temperature.

This specific arrangement is presently preferred over a number of possible alternative arrangements to produce the temperature-dependent signal Vref(T°), which varies as a function of temperature, these possible alternative arrangements including e.g. arrangements adapted to produce signals that increase with an increase in the temperature.

The fixed resistors R3 and R4 in parallel to the NTC and/or the PTC resistors are intended to linearize the thermal voltage/temperature characteristics of the NTC/PTC resistors and to smoothen out tolerances.

In the diagram of FIG. 3, the connections from the output of comparator 10 to the switches Td1 and Td2 is shown in broken lines to indicate that these connections may be provided at option depending on whether the protection sought is intended to operate only in the presence of an AC supply of the converter or also in the presence of a DC supply respectively.

As indicated, the resistor Rd2 (and Rd1) represent the natural resistance that an active component, such as a MOSFET or a BJT, shows at its output. As described in the introductory portion to this description, if a low impedance path is present in parallel to the capacitor Cs, the half-bridge cannot be re-ignited after the zero of the supply voltage, so that the converter would be stopped.

This does not apply in the case of DC operation and a low impedance path is created in parallel to the base and emitter of the "low-side" switch Tb, e.g. by switching on, namely closing, the switch Td1.

Preferably, the impedance is so low that all the current coming from the diac 30 and/or from the inductor Lb flows through the resistor Rd2, in order to avoid bad re-ignition of Tb or malfunctioning of the half-bridge due e.g. to continued operation of the half-bridge with a bad driving of the MOSFET or BJT Tb, with an ensuing risk of self-destruction due to over-heating.

Figure 4:
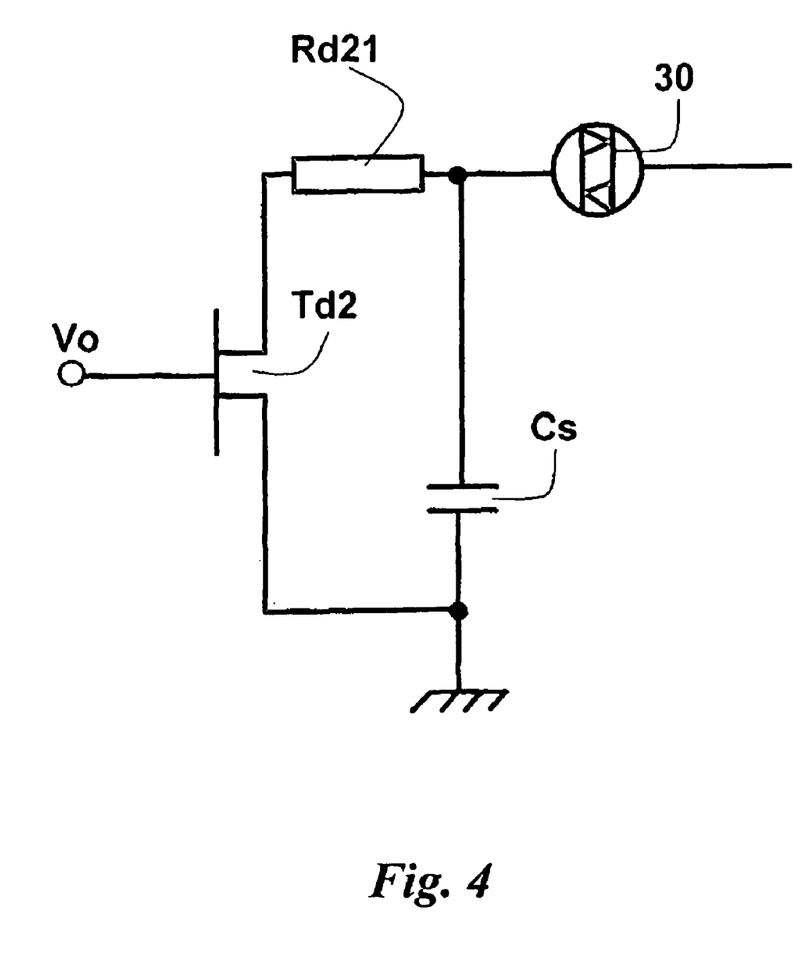
FIGS. 4 and 5 illustrate certain details of a possible embodiment of the arrangement described herein.

FIG. 4 shows a possible implementation for the switch Td2. This is essentially constituted by a MOSFET having a relatively high channel resistance, yet able to lead peak current of some hundreds mA. Providing a resistor Rd21 connected in series to the MOSFET Td2 to limit the peak current coming from the capacitor Cs during operation of Td2 (i.e. with Td2 conductive) may be advisable.

Figure 5:
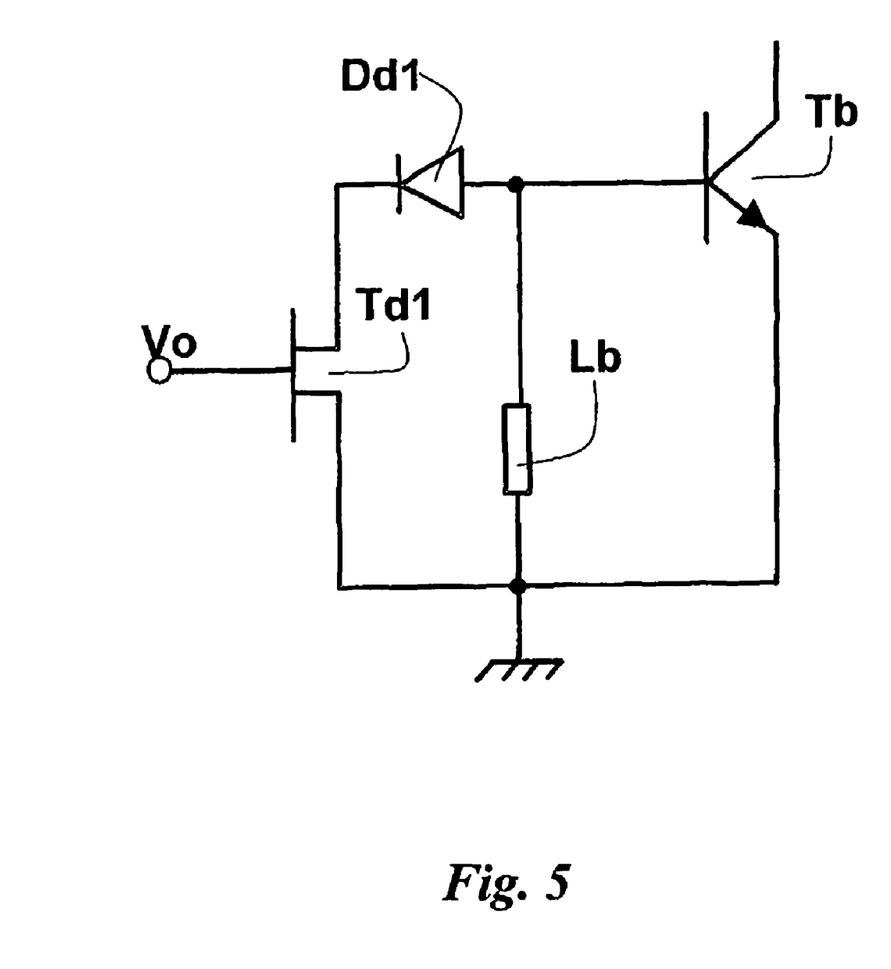

FIG. 5 shows a possible implementation of the switch Td1 when the protection device must operate also with a DC supply for the converter.

This again includes a MOSFET Td1 having a very low ohmic channel, for the reasons described before, having associated a diode Dd1. This is a Schottky diode intended to avoid that, when Td1 is switched-on (i.e. is conductive) the total voltage across Td1 and Dd1 may become higher than the threshold voltage Vbe of Tb, so that it can be never stopped. The diode Dd1 is useful in any case in order to avoid that, during normal operation of the half-bridge, the current may undesirably flow through the body-diode of Td1 when the voltage through Lb is negative.

The resistor Ra1 is essentially a bias resistor that has the role of permitting the re-ignition of the half-bridge, in the case of DC supply voltage, after the switch Td1 is no longer active. In fact, when operation of the half-bridge is discontinued, the coupling capacitor Cb discharges, and ignition of the low-side switch Tb can no longer cooperate with the half-bridge in ramping-up its auto-oscillation. The resistor Ra1 conversely ensures that the intermediate point between Ca and Cb remains polarized (at a positive voltage) so that the capacitor Cb always charged.

In the case of AC supply, Ra1 is not necessary, since a pulsed voltage is in any case present between Ca and Cb. This voltage thus always exhibits some sort of variation over time (i.e. dv/dt), which is sufficient to displace some charge in both capacitors Ca and Cb, so that the intermediate point there between is always (positively) polarized.

Consequently, without prejudice to the underlying principles of the invention, the details and the embodiments may vary, even appreciably, with reference to what has been described by way of example only, without departing from the scope of the invention as defined by the annexed claims.

The invention claimed is:

1. A device for protecting an electronic converter, the device comprising a comparator having an output as well as non-inverting and inverting inputs for receiving a first input signal indicative of the load applied to said converter and a second input signal indicative of the temperature of said converter, the comparator being in a non-inverting Schmitt-trigger configuration having an input-output characteristic with hysteresis, whereby said output is switched from a first value to a second value to switch off said electronic converter as said first input signal exceeds a first threshold value and said output is switched back from said second value to said first value to restart said electronic converter as said first input signal falls below a second threshold value, said second threshold value being lower than said first threshold value, and both said first and second threshold values being a function of said second input signal wherein said Schmitt-trigger configuration includes a feedback path between said output and said non-inverting input of said comparator, said feedback path including the parallel connection of a constant voltage source and a diode.

2. The device of claim 1, wherein in said feedback path, the positive terminal of said constant voltage source and the cathode of said diode are referred to said output of said comparator.

3. The device of claim 1, wherein said parallel connection of said constant voltage source and said diode is constituted by a Zener diode.

4. The device of claim 1, wherein the device includes a voltage divider to apply said first input signal to the respective input of said comparator.

5. The device of claim 4, wherein said voltage divider includes a resistor included in said feedback path between said output and said non-inverting input of said comparator.

6. A device for protecting an electronic converter, the device comprising a comparator having an output as well as non-inverting and inverting inputs for receiving a first input signal indicative of the load applied to said converter and a second input signal indicative of the temperature of said converter, the comparator being in a non-inverting Schmitt-trigger configuration having an input-output characteristic with hysteresis, whereby said output is switched from a first value to a second value to switch off said electronic converter as said first input signal exceeds a first threshold value and said output is switched back from said second value to said first value to restart said electronic converter as said first input signal falls below a second threshold value, said second threshold value being lower than said first threshold value, and both said first and second threshold values being a function of said second input signal, wherein the device further comprises at least one temperature-sensitive component to produce said second input signal indicative of the temperature of said converter, wherein said temperature-sensitive component is associated to one of the branches of a voltage divider and wherein said voltage divider is configured to produce said second input signal at an intermediate point between an upper branch and a lower branch of said voltage divider.

7. The device of claim 6, wherein said temperature-sensitive element is selected out of: a positive temperature coefficient resistor included in the upper branch of said voltage divider, and a negative temperature coefficient resistor included in the lower branch of said voltage divider.

8. A device for protecting an electronic converter, the device comprising a comparator having an output as well as non-inverting and inverting inputs for receiving a first input signal indicative of the load applied to said converter and a second input signal indicative of the temperature of said converter, the comparator being in a non-inverting Schmitt-trigger configuration having an input-output characteristic with hysteresis, whereby said output is switched from a first value to a second value to switch off said electronic converter as said first input signal exceeds a first threshold value and said output is switched back from said second value to said first value to restart said electronic converter as said first input signal falls below a second threshold value, said second threshold value being lower than said first threshold value, and both said first and second threshold values being a function of said second input signal wherein the device includes ripple sensing circuitry to sense a ripple present on said load as said first input signal indicative of the load applied to said converter.

9. The device of claim 8, wherein said converter includes an half-bridge arrangement having an oscillation frequency imposed thereon, wherein said ripple sensing circuitry includes a resonant circuit having a characteristic frequency substantially lower than the oscillation frequency imposed on said half-bridge arrangement in said converter.

10. The device of claim 8, wherein said ripple sensing circuitry includes a quasi peak-detector network to derive from said ripple on said load a substantially continuous signal corresponding to said first input signal indicative of the load applied on said converter.

11. A device for protecting an electronic converter, the device comprising a comparator having an output as well as non-inverting and inverting inputs for receiving a first input signal indicative of the load applied to said converter and a second input signal indicative of the temperature of said converter, the comparator being in a non-inverting Schmitt-trigger configuration having an input-output characteristic with hysteresis, whereby said output is switched from a first value to a second value to switch off said electronic converter as said first input signal exceeds a first threshold value and said output is switched back from said second value to said first value to restart said electronic converter as said first input signal falls below a second threshold value, said second threshold value being lower than said first threshold value, and both said first and second threshold values being a function of said second input signal, wherein the device includes at least one switch controlled by said output of said comparator to interrupt operation of said converter when said at least one switch is closed, wherein said converter includes a high side electronic switch and a low side electronic switch alternatively energised to feed said load, said high-side and low-side electronic switches having respective base and emitter ports, wherein said at least one switch is configured to create a low-impedance path between the base and the emitter of said low-side electronic switch.

12. The device of claim 11, wherein said at least one switch has associated a protection diode to prevent the voltage across said at least one switch and said protection diode from becoming higher than the threshold voltage of said low-side electronic switch.

13. The device of claim 12, wherein said protection diode is a Schottky diode.

14. A device for protecting an electronic converter, the device comprising a comparator having an output as well as non-inverting and inverting inputs for receiving a first input signal indicative of the load applied to said converter and a second input signal indicative of the temperature of said converter, the comparator being in a non-inverting Schmitt-trigger configuration having an input-output characteristic with hysteresis, whereby said output is switched from a first value to a second value to switch off said electronic converter as said first input signal exceeds a first threshold value and said output is switched back from said second value to said first value to restart said electronic converter as said first input signal falls below a second threshold value, said second threshold value being lower than said first threshold value, and both said first and second threshold values being a function of said second input signal, wherein said load is arranged in a rectifier bridge configuration including two rectifying capacitors having an intermediate point therebetween connected to said load, wherein it includes a bias resistor connected in parallel to one of said rectifier capacitors.

* * * * *